United States Patent [19]

Peacock

[11] Patent Number: 5,288,806
[45] Date of Patent: Feb. 22, 1994

[54] THERMOPLASTIC OLEFINS WITH LOW VISCOSITY

[75] Inventor: Andrew J. Peacock, Houston, Tex.

[73] Assignee: Exxon Chemical Patents Inc., Linden, N.J.

[21] Appl. No.: 949,302

[22] Filed: Sep. 22, 1992

[51] Int. Cl.$^5$ .................. C08L 23/06; C08L 23/16
[52] U.S. Cl. ................... 525/240; 525/197; 524/528
[58] Field of Search .......................... 525/240

[56] References Cited

U.S. PATENT DOCUMENTS

| | | | |
|---|---|---|---|
| Re. 30,405 | 9/1980 | Fischer | 525/240 |
| Re. 31,518 | 2/1984 | Fischer | 525/194 |
| Re. 32,028 | 11/1985 | Fischer | 525/194 |
| 3,835,201 | 9/1974 | Fischer | 260/897 |
| 3,862,106 | 1/1975 | Fischer | 260/80.78 |
| 3,946,897 | 3/1976 | Wolff | 260/897 |
| 4,087,486 | 5/1978 | Fielding et al. | 260/897 |
| 4,319,004 | 3/1982 | Spielau et al. | 525/88 |
| 4,319,005 | 3/1982 | Spielau et al. | 525/240 |
| 4,412,016 | 10/1983 | Fukui et al. | 523/206 |
| 4,536,549 | 8/1985 | Hattori et al. | 525/240 |
| 4,588,775 | 5/1986 | McCullough, Jr. | 525/88 |
| 4,634,740 | 1/1987 | Fujita et al. | 525/240 |
| 4,748,206 | 5/1988 | Nogiwa et al. | 525/240 |
| 4,808,665 | 2/1989 | Patel et al. | 525/240 |
| 4,822,855 | 4/1989 | Kobayashi et al. | 525/194 |
| 4,829,125 | 5/1989 | Yeo et al. | 525/194 |
| 4,910,257 | 3/1990 | Sano et al. | 525/192 |
| 4,948,840 | 8/1990 | Berta | 525/193 |
| 4,990,554 | 2/1991 | Nomura et al. | 524/423 |

*Primary Examiner*—Carman J. Seccuro, Jr.
*Attorney, Agent, or Firm*—Catherine L. Bell

[57] ABSTRACT

This invention relates to a ternary blend of 20 to 50 wt. % of random propylene copolymer of approximately 2% ethylene, 10 to 40 wt. % ethylene/propylene rubber, and 20 to 50 wt. % high density polyethylene for use as a molded article.

20 Claims, 1 Drawing Sheet

THERMOPLASTIC OLEFINS WITH LOW VISCOSITY

This invention relates to thermoplastic olefins which display unique melt flow ratio and viscosity behavior. In particular, this invention relates to thermoplastic olefins comprising a blend of polypropylene based random copolymer, ethylene propylene rubber and polyethylene.

BACKGROUND OF THE INVENTION

Polypropylene exhibits several desirable properties, for example, relatively low density excellent resistance to deformation at higher temperatures and resistance to aqueous and nonaqueous liquids. Polypropylene also has a less favorable characteristics such as inadequate impact strength at temperatures below room temperature especially below 0° C. Adequate impact strength, however, is required and is of importance in many uses such as, (for example), freight containers, suitcases, automobiles parts and similar applications. Polyethylene of high density of which such molded articles are often made, possesses satisfactorily high impact strength at low temperatures, but a lower resistance to deformations at high temperatures. Ethylene propylene copolymers, saturated as well as unsaturated, exhibit good mechanical properties, high ageing resistance, high ozone resistance as well as impact resistance at low temperatures, such that the copolymers are also excellently suited for use where the product is exposed to weathering. Due to the elastomeric properties of these copolymers, it is popular to combine such copolymers with harder polymers. Many attempts have been made to combine the properties of polypropylene and/or polyethylene and/or ethylene propylene copolymers by the production of binary or ternary blends or molding compositions. Mixtures of polypropylene and polyethylene are known, however, these mixtures exhibit an impact strength which is hardly improved over polypropylene itself. Also, blends of isotactic polypropylene and ethylene propylene elastomers, which are cross-linked or partially cross-linked by vulcanizing agents, require improvement with respect to tensile strength, tear propagation, and hardness values attainable.

Blends of polyethylene with EPDM terpolymers of ethylene, propylene and nonconjugated diene are known from U.S. Pat. No. 3,919,358 and exhibit high tear strengths. The blends do not show sufficient heat resistance due to the low melting temperature polyethylene. Ternary molding compositions are also described in British Pat. No. 1,154,447. These crystalline polypropylene, polyethylene and ethylene propylene block copolymer ternary blends exhibit a tensile strength of only 10 N/mm$^2$ and are not flexible at temperatures below 30° C.

Various polyolefin ternary blends have still been used in various industrial applications because of the balance achieved among several properties, for example, between rigidity and impact resistance. In particular, ternary blends known as thermoplastic elastomers (TPE's) are used where rigidity and impact resistance are important. Typically a thermoplastic elastomer is a blended product of a hard segment of crystalline polypropylene or crystalline polyethylene and a soft segment of an olefin elastomer such as ethylene propylene rubber (EPR), ethylene/propylene/diene terpolymer (EPDM), polyisobutylene or polybutadiene. The TPE may also be subject to partial cross-linking in order to improve physical properties. In recent years however, the required merits of the blend such as good moldability, appearance of the molded articles i.e. high gloss, paintability, thermal resistance, low temperature impact resistance and the property that the deformation caused by impact is easily restored have become more important. The conventional TPE's have not always met these requirements.

U.S. Pat. No. 4,748,206 to Nogiwa discloses quaternary blends of polypropylene, ethylene propylene rubber, Ultra Low Density Polyethylene (ULDPE) and Linear Low Density Polyethylene (LLDPE) or Medium Density Polyethylene (MDPE) and addresses some of these issues. However, the inclusion of 5 to 30 wt. % MDPE and 5 to 50 wt. % ULDPE is limiting. Spielau et al. in U.S. Pat. Nos. 4,319,004 and 4,319,005 disclose ternary blends of 38 to 48 wt. % non-amorphous ethylene propylene copolymer (at least 65 wt. % ethylene), polyethylene, preferably High Density Polyethylene (HDPE) and 3 to 30 wt. % non-amorphous propylene homopolymer or (polypropylene copolymer up to 12 wt. % ethylene).

Further Kobayashi et al (U.S. Pat. No. 4,822,855) disclose a blend of 30 to 70 parts polyethylene, 30 to 70 parts of random propylene copolymer of up to 12 wt. % ethylene and 70 to 200 parts ethylene propylene rubber. Kobayashi, however, uses very low density polyethylene (VLDPE) with a density between 0.86 to 0.91 g/cm$^3$.

U.S. Pat. No. 4,990,554 discloses a blend of (a) 75 to 97 wt % of a blend of (1) 90-65 parts crystalline polypropylene (2) an ethylene copolymer (7 or less percent by weight ethylene) and/or propylene homopolymer and (3) 10-35 parts polyethylene and (b) 25-3 wt % filler.

U.S. Pat. No. 4,948,840 discloses a blend of (1) 10-70 parts by weight of propylene (2) 20-60 parts of EPR (3) 10-30 parts semi crystalline, low density, essentially linear ethylene propylene copolymer and (4) 3-15 parts 1,2 polybutadiene and a peroxide crosslinking agent.

U.S. Pat. No. 4,88,775 discloses 50-96 wt % impact modified polypropylene polymer, 2-45 wt % of HDPE homopolymer, 2-45 wt % LLDPE and 0-30 wt % EPR or EPDM.

There still exist a need in the art to develop a rubber toughened thermoplastic olefin for use in molded applications that has a higher MFR which leads to easier moldability.

Indeed, many compositions with ethylene/propylene rubber in them would have very good physical properties if they could be molded. However, the increase in ethylene/propylene rubber proportion in these blends tends to increase viscosity, i.e., decrease the overall melt flow ratio of the mixture. Thus, a high amount of ethylene propylene rubber makes a TPE blend difficult if not impossible to process. Thus, there still exists a need in the art to develop a rubber toughened thermoplastic olefin for use in molded applications that can be more easily molded.

SUMMARY OF THE INVENTION

This invention relates to a blend of polypropylene based random copolymer containing up to about 6 mole % ethylene [RCP], high density polyethylene [HDPE], and ethylene/alpha-olefin rubber [ER]. The random copolymer is present in the blend from 20 to 60 wt. % preferably 35 to 50 wt. %. The ER is present from 10 to 40 wt. % preferably 15 to 30 wt. % and high density polyethylene is present from 20 to 50 wt. % preferably 25 to 45 wt. %. The high density polyethylene used in this invention has an MFR of approximately 5, and a density in the range of 0.94 g/cm$^3$ and above. The random copolymer used in this invention may preferably contain up to about 6 mole percent more preferably 1.5 to 4.5 mole % ethylene more preferably 2.5 to 3.5 mole %. Compositions of this invention can be blow molded, extruded or injection molded into articles. Such articles may include automobile body parts, bumpers, facia, interior trim, exterior trim, weather trim, hoses, exterior parts, wheel arches, air dams and the like.

DETAILED DESCRIPTION OF THE INVENTION

Figure 1:
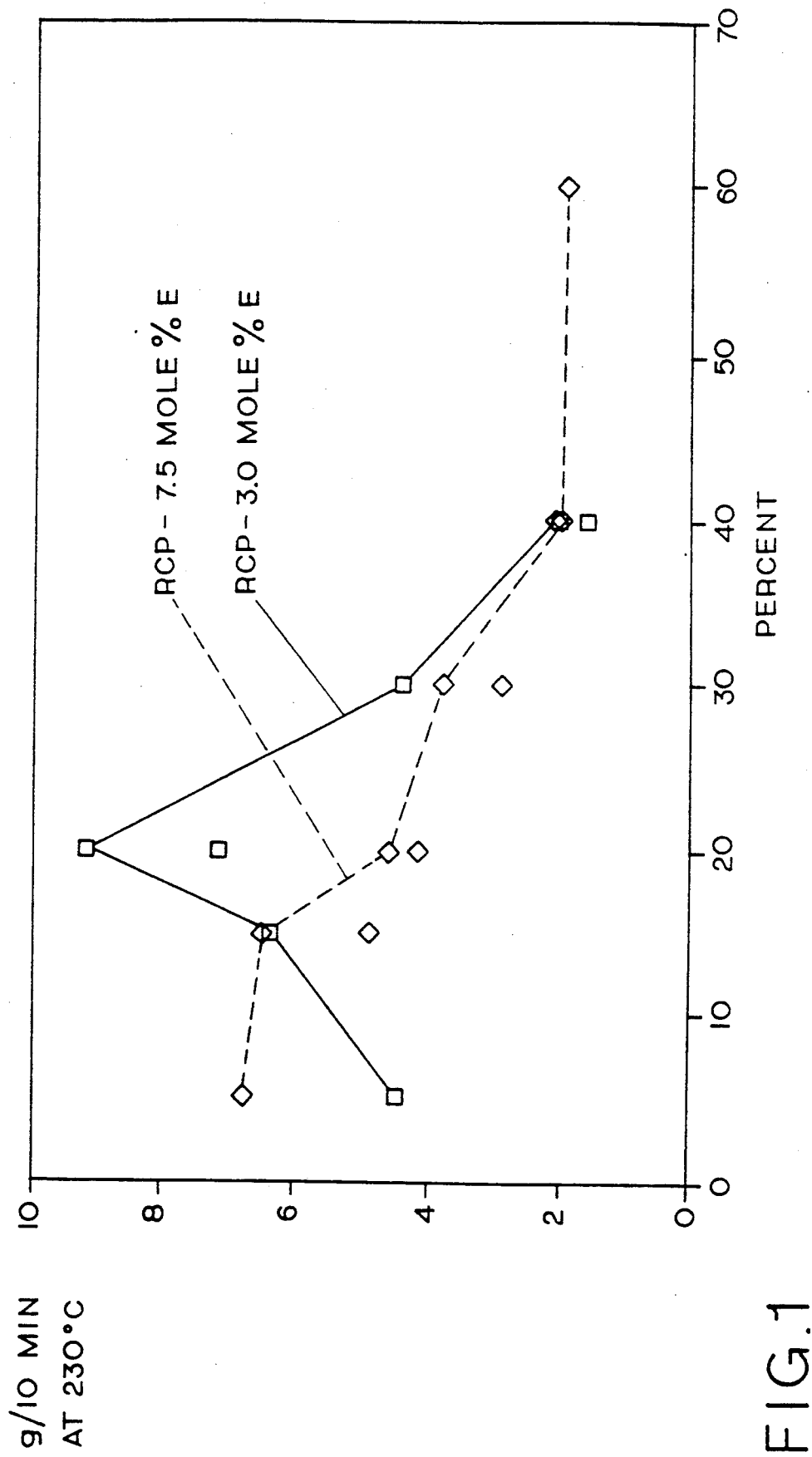
FIG. 1 is a graph of the melt flow rate versus EPR content for blends comparing random copolymer with 7.5 mole % ethylene to random copolymer with 3 mole % ethylene.

This invention relates to a blend of polypropylene based random copolymer [RCP], polyethylene [PE], and ethylene/alpha-olefin rubber [ER]. In particular, the blend of this invention is 20 to 60%, preferably 35 to 50% random copolymer more than 10 but less than 40 wt. % ER, preferably 15 to 30 wt. % and 20 to 50 wt. % high density polyethylene, preferably 25 to 45 wt. % The random copolymer useful in this invention is a propylene based copolymer produced by the methods well known in the art that contains up to about 6 mole %, preferably 1.5 to 4.5 mole % more preferably 2.5 to 3.5 mole % of a $C_2$ to $C_{20}$ α-olefin. Examples of the α-olefin include but are not limited to, ethylene, butene, hexene, pentene, octene-1 and 4-methylpentene-1. A preferred α-olefin is ethylene.

A polyethylene useful in this invention is a high density polyethylene with a density of 0.940 to 0.960 g/cm$^3$ or above measured at ASTM conditions with an ethylene content of 95 to 100%. Such HDPE is available commercially from Exxon Chemical Company under the trade name ESCORENE.

In general polyethylene of more than 0.940 g/cm$^3$ is regarded as being high density polyethylene (HDPE). Polyethylene of 0.915 to 0.940 g/cm$^3$ density is considered low density polyethylene (LDPE). Very low density polyethylene (VLDPE) is considered to have a density from 0.90 to 0.915 "plastomers" typically have a density from 0.865 to about 0.900 g/cm$^3$.

In general, the ethylene rubber useful in the invention is an amorphous ethylene/α-olefin copolymer or amorphous ethylene/α-olefin nonconjugated diene terpolymer. In the ethylene α-olefin copolymer examples of the α-olefin include propylene butene-1, pentene-1, 4-methylpentene-1, hexene-1, octene-1, with propylene being particularly preferred. The ethylene propylene rubber useful in this invention is available from Exxon Chemical under trade name Vistalon and is characterized by having an MFR of less than 1 and ethylene content of approximately 77% by weight.

Examples of the nonconjugated diene are 1,4 hexadiene, 1,6 octadiene, cyclopentadiene, vinyl norbornene and ethylidiene norbornene with 1, 4 hexadiene and ethylidiene norbornene being preferred. An ethylene/α-olefin copolymer is distinguished from ethylene/α-olefin rubbers in that even if both are at the same point of the constituent monomers and density, the maximum peak temperature TM is much higher in the ethylene propylene copolymer. If the ethylene α-olefin rubber has a maximum peak temperature, it is typically in the range of 30° to 50° C. at most. Also ethylene alpha-olefin rubbers typically contain very small amounts of hexane insolubles or do not contain hexane insolubles at all. The two copolymers are also greatly different in preparation. The ethylene/α-olefin copolymer is typically prepared using a catalyst which contains magnesium and titanium while an ethylene alpha-olefin rubber is usually prepared using vanadium catalyst.

The compositions of the present invention are excellent in the properties of moldability and appearance. When inorganic filler is added to the composition, the properties obtained, especially when vehicle exterior members are produced are improved, not only in scratch resistance but also in thermal resistance, paintability and rigidity. Therefore, the blends of this invention may also have typical fillers and additives blended into the composition to enhance their properties for their ultimate use. Inorganic filler which may be blended into applicants' invention are exemplified by powdery or granular fillers such as calcium carbonate, calcium hydroxide, calcium sulfate, calcium silicate, magnesium oxide, magnesium hydroxide, basic magnesium carbonate, magnesium calcium carbonate, aluminum hydroxide, barium carbonate, barium hydroxide, zinc carbonate, clay, diatomaceous earth, talc, alumina, siliceous sand, glass power, iron oxide, glass fiber, metallic powder, silicon carbide, silicon nitride, silica, boronitride, aluminum nitride and carbon black; flaky or scaly fillers such as mica, glass flakes, sericite, pyrophyllite, graphite, metal foils such as aluminum flakes; hollow fillers such as Shirasu balloon, metallic balloon, glass balloon, pumice; and mineral fibers such as glass fiber, carbon fiber, graphite fiber, whisker, metal fiber, silicone carbide fiber, asbestos and wollastonite. Among them preferable ones are calcium carbonate, calcium silicate, magnesium hydroxide, clay, talc, silica, carbon block, mica, glass flakes, glass fiber, carbon fiber, graphite fiber and whisker and more preferable ones are calcium carbonate, talc and mica. The addition quantities of these fillers is up to 100 parts by weight to 100 parts by weight of the composition of the present invention. The addition quantity of filler is in excessive of 100 parts by weight is undesirable because the impact resistance of the form product can be lowered. In the present, if any of the above inorganic fillers are used it is preferable that the filler are surface treated with a fatty acid such as stearic acid, oleic acid, palmitic acid whether metal salts, paraffin wax, polyethylene wax or modified products or organic silane, organic borane or organic titanate.

The composition of the present invention can also include other components such as thermoplastic resins, antioxidants, thermal stabilizers, (hindered phenols, phosphites, hydroquinones and thioethers), UV absorbers (benzotriazoles, resorcins and salicylates) dyes or pigments, flame retardants, antistatic agent, nucleating agents (crystallinity improvers) lubricants, plasticizers and release agents. Likewise two or more of these additives can be used.

The blends of this invention can be produced in a two step process. Master batches of the random copolymer and the ethylene rubber are prepared under high shear to produce an intimate blend of small ER particles in a matrix of random copolymer. The dry blend is then extruded and pelletized. A Werner and Pfleiderer 50 mm twin screw extruder under conditions of minimum breakdown is adequate for this purpose.

The RCP/ER master batch pellets are then barrel tumbled with PE pellets to produce a dry blend that is then extruded and pelletized. A 60 mm Reifenhauser single screw extruder is adequate for this purpose. The pellets produced in the second step comprise the thermoplastic olefins of this invention.

All the components of thermoplastic olefins embodied in the examples are commercial materials available from Exxon Chemical Company. The key characteristic of these materials are listed below in the following table I.

TABLE I

| Polymer Type | Commercial Trade Designation | MFR (g/cm³) | Density Content | Ethylene |
|---|---|---|---|---|
| RCP | PD-9122 | 1.8–2.3 | — | ~3 mole % |
| RCP | PD-9282 | 4.6–5.4 | — | ~7.5 mole % |
| EPR | Vistalon 719 | <1 | — | ~77 weight % |
| HDPE | HD-6901.57 | ~5 | 0.965 | 100% |

*All of the component parts are available from Exxon Chemical Company.
**HDPE = High density polyethylene.

Sample morphology was determined by scanning electron microscopy (SEM). Small blocks of the thermoplastic olefin of the invention measuring 2 mm by 2 mm by 1 mm were cut from Izod test pieces, 25 mm from end, 3 mm from the edge and 1 mm from the surface. One face of the block, parallel with the machine direction was cryomicrotomed with a fresh glass knife at −130° C. to give a microscopically smooth surface. The microtomed phase was etched with xylene at room temperature for 20 minutes in an ultrasonic bath to dissolve the exposed EPR regions. Samples were degassed under a vacuum for 2 hours then vacuum coated with gold for 1 minute, to lay down a coating of ~100 angstroms thick. Scanning electron micrographs were recorded on Amray 1200 SEM.

The inventor has surprisingly found that certain blends of random copolymer, ethylene/propylene rubber and high density polyethylene have a unique melt flow rate when compared to ethylene/propylene rubber content. The blends typically are characterized by an MFR at or above 2 g/10 min at 230° C. preferably at or above 4 g/10 min at 230° C., even more preferably at or above 6 g/10 min at 230° C. As a general rule it would be expected that increasing the concentration of a high viscosity element such as ethylene/propylene rubber in a blend would decrease the overall MFR of the mixture. As MFR is inversely related to viscosity, a high MFR is equivalent to low viscosity. It would be expected that increasing the concentration of high viscosity EPR in a blend would decrease the overall MFR of the mixture which is indeed the case when 7.5 mole % ethylene random copolymer is blended with ethylene/propylene rubber and high density polyethylene. Five weight % (7.5 mole %) ethylene random copolymer is represented by the diamonds in FIG. 1. The inventor, however, has discovered a unique difference with the 1.5 to 4.5, particularly the 3 mole percent ethylene random copolymer in the specific portion dileneated above. It has been found that at certain weight percents of ethylene/propylene rubber content a high MFR is obtained much higher than would be expected of any random copolymer. This is unique and valuable as now thermoplastic olefin composition blends containing higher amounts of ethylene/propylene rubber can be molded over what has gone before.

Indeed, melt flow rate of a thermoplastic olefin is important in determining how readily it can be injection molded. Samples with a very low MFR, typically less than 1, are very viscous. Viscous samples are difficult to mold because they do not readily fill the mold. High temperatures, high pressure and a slow injection rate are normally required to mold high viscosity resins. Industry and manufacturers do not appreciate having to use any of these conditions, as they are expensive and time consuming. Indeed, the more complex the part to be molded or the greater the aspect ratio (length to thickness ratio) the worse the problems will be. Ideally a molding resin would have an MFR in the region of 5 to 20. The MFR of a TPO is therefore an important property of interest to the automotive industry, where relatively thin parts such as bumper covers or air dams are to be molded. It has been found that very particular blends of the random copolymer ethylene/propylene rubber, and high density polyethylene, in very specific ranges will produce a thermoplastic olefin with a melt flow rate improved over what would be expected. Please refer to FIG. 1. Please note that what is expected in the art is represented by the diamonds which are the blends of 7.5 mole % ethylene random copolymer with 25 to 80% random copolymer, 5 to 40% EPR and 15 to 45% high density polyethylene in various combinations. The individuals combinations are reproduced in Table 2. These data are to be compared with the 3 mole % ethylene random copolymer present in proportations of 25 to 80 wt. % random copolymer, 5 to 40 wt. % ethylene/propylene rubber, and 15 to 45 wt. % high density polyethylene. The individual combinations are reproduced in Table 2 as well. Please note that at the range between approximately 15 and 40 wt. % ethylene/propylene rubber that the 3 mole % ethylene random copolymer blends have a strikingly different melt flow rate. In fact, at 20 wt. % ethylene/propylene rubber the MFR significantly increases rather than decrease as one would expect in the art. These results indicate that a higher content of ethylene/propylene rubber now can be incorporated into a thermoplastic olefin and still maintaining a melt flow rate that is processable in modern machinery without serious alteration or having to significantly alter the conditions of processing to those that are slow and time consuming.

EXAMPLES

The samples listed in Table 2 below were produced in a two step process. The RCP and EPR pellets at an appropriate ratio were barrel tumbled to produce a dry blend, then extruded and pelletized on a Werner and Pfleiderer 57 mm twin screw extruder under conditions of minimum breakdown. The masterbatch produced was an intimate blend of small EPR particles (less than approximately 1 micrometer in diameter) in a matrix of random copolymer. The masterbatches were then barrel tumbled with high density polyethylene pellets at an appropriate proportion for extrusion and pelletization on a 60 mm Reifenhauser single screw extruder. The pellets produced in this second step comprise the thermoplastic olefins under consideration. This process ensured that the various components having widely different viscosities should be well mixed, but it is not the only method available to prepare these blends.

Viscosity determination, the melt flow rate (MFR), of the samples of the thermoplastic olefins was determined was ASTM 1238 using a load of 2.16 kg at 230° C. In this test a standard mass of polymer is packed into a cylinder with a small orifice at the bottom. After heating to the desired temperature, a load is applied and the mass of the polymer in grams extruded from the orifice in 10 minutes is reported as the MFR. The MFR is a measure of how readily the polymer will flow under applied load and the far is inversely related to viscosity, i.e., high MFR is equal to a low viscosity. The following table lists the various compositions that have been examined.

TABLE 2

| RCP Type | PE Type | RCP (%) | EPR (%) | HDPE (%) |
|---|---|---|---|---|
| PD-9282 | HDPE | 25 | 40 | 35 |
| PD-9282 | HDPE | 35 | 40 | 25 |
| PD-9282 | HDPE | 35 | 30 | 35 |
| PD-9282 | HDPE | 35 | 20 | 45 |
| PD-9282 | HDPE | 45 | 20 | 35 |
| PD-9282 | HDPE | 60 | 15 | 25 |
| PD-92B2 | HDPE | 80 | 5 | 15 |
| PD-9122 | HDPE | 25 | 40 | 35 |
| PD-9122 | HDPE | 35 | 40 | 25 |
| PD-9122 | HDPE | 35 | 30 | 35 |
| PD-9122 | HDPE | 35 | 20 | 45 |
| PD-9122 | HDPE | 45 | 20 | 35 |
| PD-9122 | HDPE | 60 | 15 | 25 |
| PD-9122 | HDPE | 80 | 5 | 15 |

FIG. 1 shows how the viscosity, measured as MFR, varies with ER content.

As is apparent from the foregoing description, the materials prepared and the procedures followed relate to specific embodiments of the broad invention. It is apparent from the foregoing general description and the specific embodiments that while forms of the invention have been illustrated and described, various modifications can be made without departing from the spirit and scope of this invention. Accordingly, it is not intended that the invention be limited thereby.

I claim:

1. A composition of matter consisting essentially of:
   a) about 20 to about 60 wt % random propylene copolymer (RCP) having about 1.5 to about 6 mole percent α-olefin comonomer;
   b) about 10 to about 30 wt % ethylene/α-olefin rubber having a viscosity higher than a) or c) (ER); and
   c) about 20 to about 50 wt % polyethylene (HDPE) with a density of 0.94 g/cm³ or above,
   said wt % being based upon the total weight of a, b and c, said composition of a), b) and c) and the mixture of a) and c) having a melt flow ratio of 2 g/10 min. or more at 230° C.

2. A composition consisting essentially of
   a) about 20 to about 60 wt % random propylene copolymer having about 1.5 to about 6 mole percent α-olefin comonomer;
   b) about 10 to about 30 wt % ethylene/α-olefin rubber having a viscosity higher than a) or c);
   c) about 20 to about 50 wt % polyethylene with a density of 0.94 g/cm³ or above, said wt % being based upon the total weight of a, b and c; and
   d) a filler in an amount of up to 100 parts filler per 100 parts of the combination of a, b, & c, said composition of a), b), and c) and the mixture of a) and c) having a melt flow ratio of 2 g/ 10 min. or greater at 230° C.

3. The composition of claim 1, or 2, wherein the random propylene copolymer is present from about 35 to about 50 wt %.

4. The composition of claim 1, or 2, wherein the ethylene/α-olefin rubber is present at about 15 to about 30 wt %.

5. The composition of claim 1, or 2 wherein the polyethylene is present at about 25 to about 45 wt %.

6. A composition consisting essentially of:
   a) about 35 to about 50 wt % random propylene copolymer containing about 1.5 to about 4.5 mole percent ethylene;
   b) about 15 to about 30 wt % ethylene/α-olefin rubber having a viscosity higher than a) or c);
   c) about 25 to about 45 wt % polyethylene with a density of 0.94 g/cm³ or above; and
   d) optionally, filler present at 100 parts per 100 parts of the combination of a, b and c, said composition of a), b) and c) and the mixture of a) and c) having a melt flow ratio of 2 g/10 min. or greater at 230° C.

7. The composition of claim 1, 2 or 6 wherein the α-olefin comonomer of the random propylene copolymer is ethylene.

8. The composition of claim 1, 2 or 6, wherein the α-olefin comonomer of the ethylene/α-olefin copolymer rubber is propylene.

9. The composition of claim 1, 2 or 6, molded into an article.

10. The composition of claim 1, 2 or 6, molded into a bumper, automotive facia, interior trim, exterior trim, weather trim, hose, wheel arch, air dam storage container, bottle, appliance cover, or appliance part.

11. The composition of claim 1, 2 or 6, wherein the RCP contains 2.5 to 3.5 mole % α-olefin.

12. The composition of claim 1, 2, or 6, wherein the composition is characterized by an MFR at or above 4 g/10 min at 230° C.

13. The composition of claim 1, 2, or 6, wherein the composition is characterized by an MFR at or above 6 g/10 min at 230° C.

14. A process for producing the polymeric composition comprising, blending, a), b) and c).

15. The process of claim 14, wherein the rubber is first blended with the random copolymer and subsequently blended with the polyethylene.

16. A product produced by the process of claim 15.

17. A product produced by the process of claim 14 or 15, wherein the polymeric composition product is characterized by an MFR at or above 4 g/10 min at 230° C.

18. A product produced by the process of claim 14 or 15, wherein the polymeric composition product is characterized by an MFR at or above 6 g/10 min at 230° C.

19. The product of claim 16 further blended with filler.

20. The product of claim 19 molded into an article.

* * * * *